(12) United States Patent
Hamory et al.

(10) Patent No.: US 9,444,548 B1
(45) Date of Patent: Sep. 13, 2016

(54) WAVELET-BASED PROCESSING FOR FIBER OPTIC SENSING SYSTEMS

(71) Applicant: The United States of America as Represented by the Administrator of NASA, Washington, DC (US)

(72) Inventors: Philip J Hamory, Lancaster, CA (US); Allen R Parker, Jr., Lancaster, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 56 days.

(21) Appl. No.: 14/514,752

(22) Filed: Oct. 15, 2014

(51) Int. Cl.
| | | |
|---|---|---|
| *H04N 5/217* | (2011.01) | |
| *H04B 1/69* | (2011.01) | |
| *G06K 9/36* | (2006.01) | |
| *G06K 9/46* | (2006.01) | |
| *H04B 10/25* | (2013.01) | |
| *H04J 14/02* | (2006.01) | |
| *H04Q 11/00* | (2006.01) | |

(52) U.S. Cl.
CPC .............. *H04B 10/25* (2013.01); *H04J 14/02* (2013.01); *H04Q 11/0005* (2013.01); *H04Q 2011/0016* (2013.01); *H04Q 2011/0022* (2013.01)

(58) Field of Classification Search
CPC .................. H04Q 2011/0016; H04Q 11/0005
USPC ......................... 398/87, 85, 82, 79
See application file for complete search history.

(56) References Cited

U.S. PATENT DOCUMENTS

| | | | | |
|---|---|---|---|---|
| 5,453,945 A | * | 9/1995 | Tucker ................... | G06T 9/007 382/251 |
| 5,740,036 A | * | 4/1998 | Ahuja .................... | G01V 1/368 702/17 |
| 5,754,702 A | * | 5/1998 | Simpson ................ | G06T 9/004 382/233 |
| 5,798,521 A | | 8/1998 | Froggatt | |
| 5,883,978 A | * | 3/1999 | Ono ........................ | H04N 19/61 375/240.11 |
| 6,208,951 B1 | * | 3/2001 | Kumar .................... | G06T 5/10 702/189 |
| 6,236,758 B1 | * | 5/2001 | Sodagar ................ | H04N 19/647 375/240.19 |
| 6,566,648 B1 | | 5/2003 | Froggatt | |
| 6,633,677 B1 | * | 10/2003 | Dube ...................... | G06T 17/00 382/236 |
| 6,678,422 B1 | * | 1/2004 | Sharma .................. | G06T 9/007 382/240 |
| 8,700,358 B1 | | 4/2014 | Parker, Jr. | |
| 2003/0053717 A1 | * | 3/2003 | Akhan .................. | G06T 3/4084 382/302 |
| 2003/0152278 A1 | * | 8/2003 | Temizel ................. | G06T 9/007 382/233 |
| 2005/0132712 A1 | * | 6/2005 | Krok ...................... | F04D 27/001 60/772 |
| 2005/0228654 A1 | * | 10/2005 | Prieto ................. | G10L 19/0216 704/220 |
| 2006/0017662 A1 | * | 1/2006 | Beuker ................ | G09G 3/2003 345/72 |
| 2006/0088096 A1 | * | 4/2006 | Han ....................... | H04N 19/00 375/240.03 |
| 2008/0298463 A1 | * | 12/2008 | Stivers ................... | G09G 5/003 375/240.21 |

* cited by examiner

Primary Examiner — Oommen Jacob
(74) Attorney, Agent, or Firm — Mark Homer

(57) ABSTRACT

The present invention is an improved method of processing conglomerate data. The method employs a Triband Wavelet Transform that decomposes and decimates the conglomerate signal to obtain a final result. The invention may be employed to improve performance of Optical Frequency Domain Reflectometry systems.

18 Claims, 3 Drawing Sheets

Figure 1 – Prior Art

WAVELET-BASED PROCESSING FOR FIBER OPTIC SENSING SYSTEMS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to fiber optic sensing systems and more particularly to processing data obtained from such systems.

2. Description of the Related Art

Fiber Bragg Grating (FBG) sensors, which are basically gratings along optical fibers that act as mirrors to light sources, provide many attractive characteristics compared to other sensing systems. These include their inherent light weight, small size, and immunity to electromagnetic radiation and radio-frequency interference.

These features enable using many sensors on a single optical fiber at either interval, arbitrary, or continuous spacing. Thus, a user can interrogate each sensor independently and obtain a distributed measurement over large structures. Because the gratings are multiplexed on a single fiber, many sensors can be accessed with a single connection to the optical source and detector. Hence, FBG sensors are highly attractive to the aerospace community. For example, U.S. Pat. No. 5,798,521 discloses an apparatus and method for measuring strain in structures using a plurality of FBG sensors and an improvement to this apparatus and method is disclosed in U.S. Pat. No. 6,566,648. A significant improvement in processing data obtained by the type of system described in these patents is described in U.S. Pat. No. 8,700,358. These patents are hereby incorporated by reference into this application.

As noted above, the current state of the art in fiber optic sensing systems and data processing is described in U.S. Pat. No. 8,700,358. In the system, hundreds of strain measurement locations (FBGs) exist along a single optical fiber. A laser light source excites the fiber, and reflections from each measurement location return to an optical detector. The reflections from each location are superimposed together and show up as one massive, conglomerate signal. The first main signal processing task is to demultiplex the conglomerate signal, i.e. to split out the individual signals from the huge conglomeration. Then the second task is to determine the measurement value for each individual measurement location. This second task consists of performing a centroid calculation and converting the result to strain. A summary of the overall process is given in FIG. 1.

The improvement in data processing described in U.S. Pat. No. 8,700,358 includes a much faster method of demultiplexing the conglomerate signal described above compared to that described in the U.S. Pat. No. 6,566,648 patent. Basically, the method involves dividing the raw data into a plurality of segments over time/wavelength. A Fast Fourier Transform is done on each of the segments in order to obtain frequency/positional data.

While this method significantly decreases the processing time and increases the refresh rate for an Optical Frequency Domain Reflectometry (OFDR) system, it does not provide efficient variable length segment resolution. Also, this method requires that the signal length be a power of two for maximum speed efficiency. In addition, this method requires processing data for the entire reference length of fiber selected (if a user wants to measure only data from a portion of the fiber, data for the entire fiber still needs to be processed).

Therefore, it is desired to provide an improved demultiplexing process for OFDR systems that provides efficient variable length segment resolution, does not require a signal length to be a power of two, maintains or decreases processing time and noise levels, allows a user to process data associated with only part of the fiber rather than the whole length, and adapts the resolution of a portion of the length of an optical fiber in real time.

SUMMARY OF THE INVENTION

The invention proposed herein comprises an improved method to obtain and process the raw data (conglomerate signal) obtained from an OFDR system in order to, ultimately, obtain strain values.

Accordingly, it is an objective of this invention to provide an improved demultiplexing process for OFDR systems.

It is another objective to provide an improved demultiplexing process for OFDR systems that provides efficient variable length segment resolution.

Yet another objective is to provide an improved demultiplexing process for OFDR systems that allows a user to process data from only a portion of the measurement fiber length.

It is still a further objective to provide an improved demultiplexing process for OFDR systems that can adapt itself in real time to provide the correct amount of spatial resolution according to minimum and maximum limits specified by the user in order to obtain strain values from the systems.

It is also an objective to provide a method of using results from previous scans to focus OFDR processing on wavelengths of interest, which may be different at different locations, along the optical fiber in order to reduce the amount of data being processed on subsequent scans.

This invention meets these and other objectives related to processing data obtained from an OFDR fiber optic strain sensing system by providing an improved method to complete the demultiplexing step for processing raw data from an OFDR system. The improved method employs a novel triband wavelet transform concept. The raw data is run through each of a lowpass wavelet filter, a midband wavelet filter, and a highpass wavelet filter. Each of the three resulting data groups is then run through each of the filters again. This process is repeated as needed until the data is fully demultiplexed according to user-defined resolution requirements. In a preferred embodiment of the invention, the data run through lowpass and highpass filters is decimated by two and the data run through the midband filter is decimated by 3.

Finally, the invention includes a method of analyzing data from previous scans of an OFDR system to enable one to skip some of the data that needs to be processed from subsequent scans in order to increase the processing speed of the system.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

Figure 1:
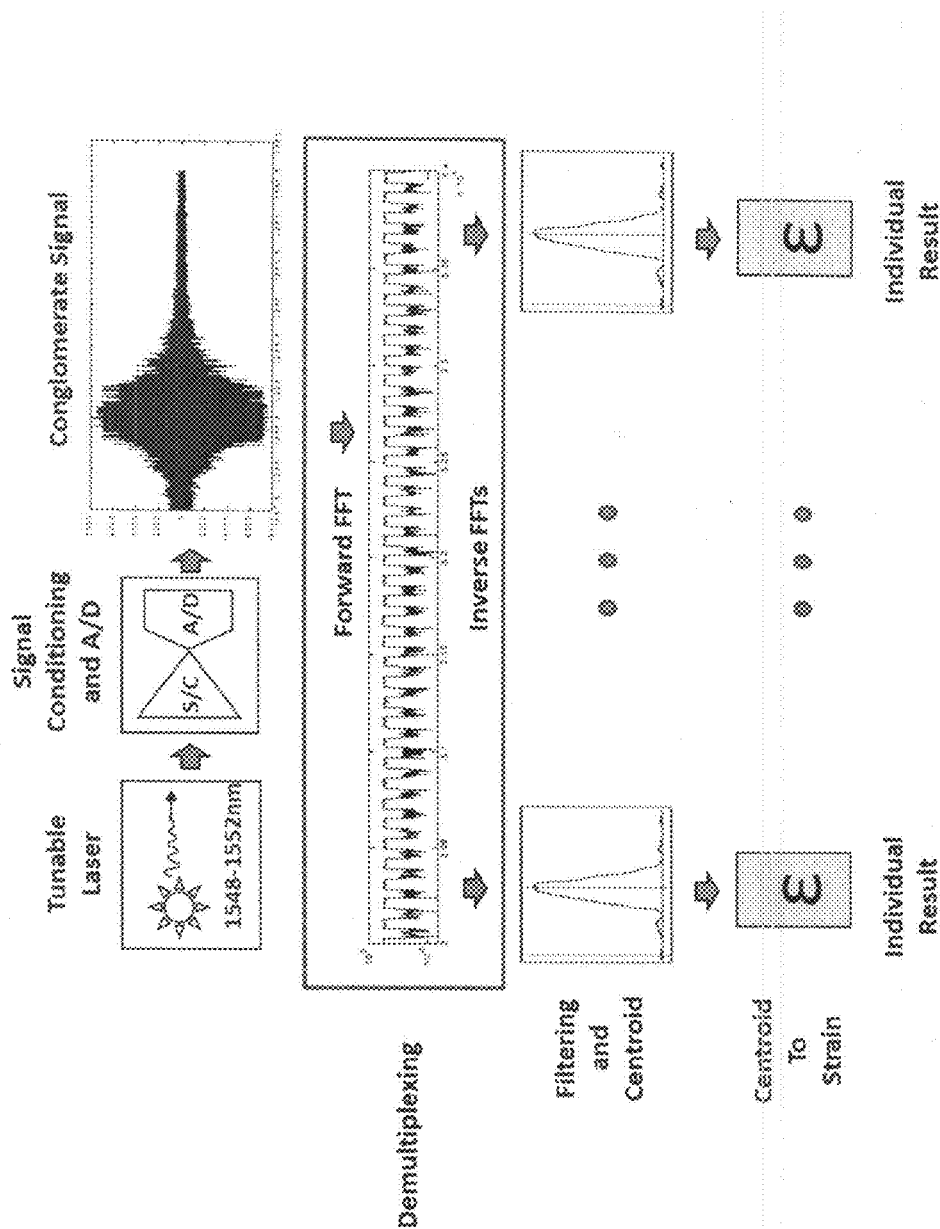
FIG. 1 depicts a summary of the prior art fiber optic sensing system signal processing flow.

In a standard OFDR system used to determine strain along an optical fiber, as discussed above, hundreds of strain measurement locations (FBGs) exist along the single optical fiber. A laser light source excites the fiber, and reflections from each measurement location return to an optical detector. The reflections from each location are superimposed together and show up as one massive, conglomerate signal, as depicted in FIG. 1. The first main signal processing task is to demultiplex the conglomerate signal in order to split out the individual signals from the huge conglomeration. The second processing task is to determine the measurement value for each individual measurement location. This second task consists of performing a centroid calculation and converting the result to strain information.

Before proceeding to a detailed description of the invention, a brief description of the preferred hardware and concepts related to an OFDR system employed for the purposes discussed herein is described below.

The light source in the system is preferably tunable laser that sweeps over a specified range of wavelengths, e.g. 1542-1551 nm, at a specified sweep rate, e.g. 400 nm/s. For each scan over the specified range of wavelengths, N samples are collected by the analog-to-digital (A/D) converter. These are the samples that form the conglomerate signal. A typical value for N is 262144.

It should be mentioned that in a preferable system setup, light from the tunable light source is not only supplied to the measurement fiber but also to a reference fiber. The length of this reference fiber (Lref) and the sweep rate work together to produce the A/D clock rate. Because the A/D clock rate is related to the length of the reference fiber, the N samples collected are also related to the length of the reference fiber.

Because each position on the fiber corresponds to a different frequency, looking at the conglomerate signal in the frequency domain, the signals from each measurement location are at a different frequency. The demultiplexing step from FIG. 1 depicts a plot of the frequency domain representation of the conglomerate signal. The plot has evenly spaced plateaus which are the reflections from those gratings.

The present invention is a novel method to demultiplex the conglomerate signal discussed above. In lieu of using Short-Time Fourier-Transforms (STFTs) as described in U.S. Pat. No. 8,700,358, this invention uses a modified Wavelet Packet Transform (WPT). A conventional WPT does not produce suitable results because of the aliasing inherent in it. This is because, wavelet filters are designed to have a cutoff frequency of 0.25*the sample rate (0.25 fs, where fs is the sampling frequency). Thus, the lowpass wavelet filter passes frequencies from 0 to 0.25 fs, and the highpass wavelet filter passes frequencies from 0.25-0.50 fs. In operation, in the area between the lowpass and highpass filters, aliasing (folding over of the signal) occurs which creates too much noise, contaminating the signal in this area. This results in data which is unusable for the purposes described herein. For example, if there is full scale signal power at 0.275 fs, a little over 30% of it will appear at 0.225 fs.

However, this invention is a modified WPT that effectively eliminates the aliasing problem. It does so by using three sub-bands, rather than two, and thus is called the Triband Wavelet Transform (TWT).

Figure 2:
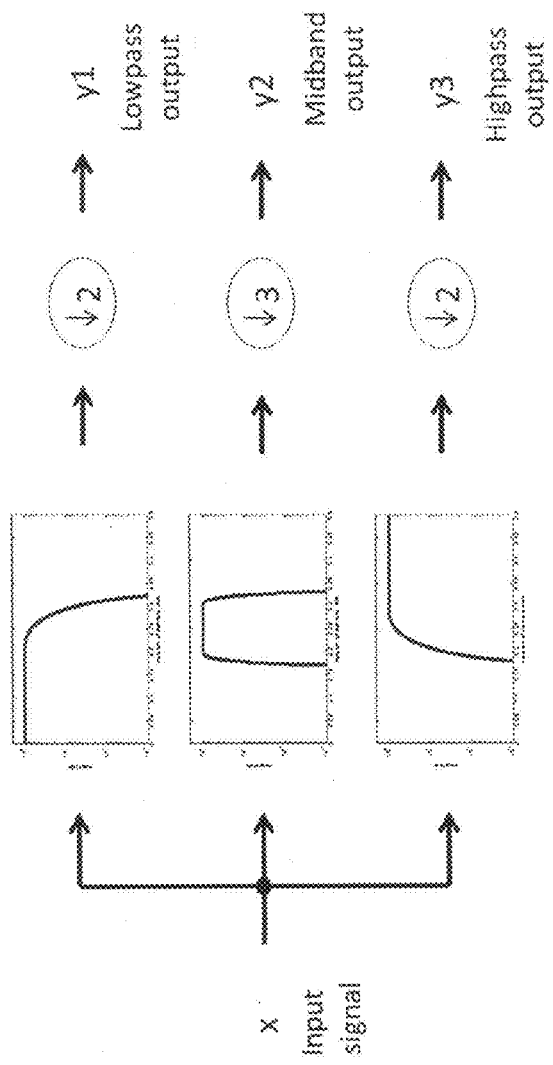
FIG. 2 depicts a block diagram of the TWT of the present invention based on the Discrete Wavelet Transform.
Figure 3:
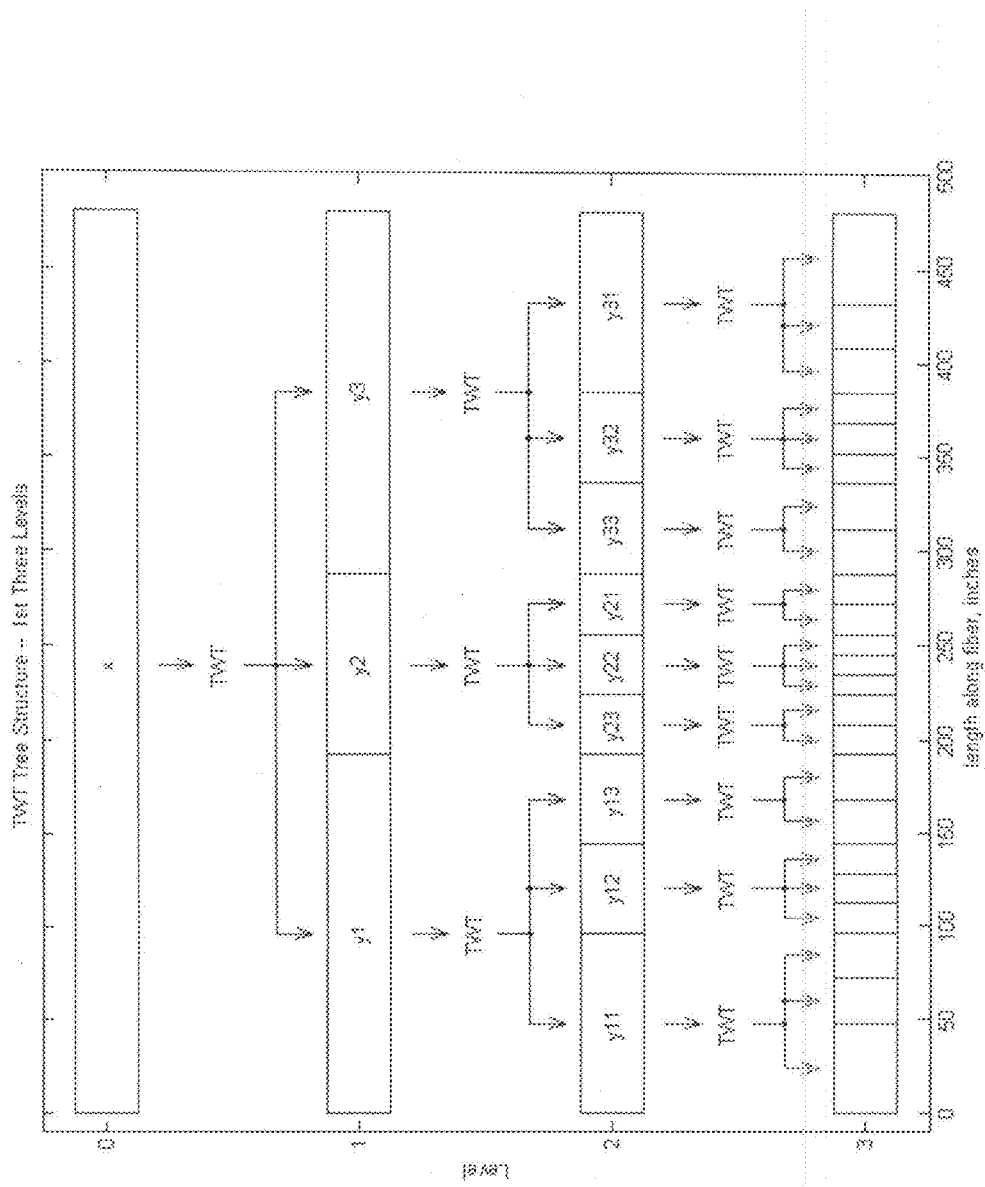
FIG. 3 depicts a decomposition tree through three Levels of decomposition of an example of the present invention.

Rather than using only lowpass and highpass wavelet filters, the TWT uses lowpass, midband, and highpass filters. The midband filter is constructed by cascading a twice-upsampled version of the lowpass filter with a once-upsampled version of the highpass filter. The upsampling is dyadic. The bandwidth of the lowpass filter is considered to be from 0 to about 0.2 fs. The bandwidth of the midband filter is considered to be from about 0.2 fs to about 0.3 fs. And the bandwidth of the highpass filter is considered to be from about 0.3 fs to 0.5 fs. After filtering, signals passing through the lowpass and highpass filters are decimated by 2, and signals passing through the midband filter are decimated by 3. FIG. 2 depicts a block diagram of the TWT, and FIG. 3 shows a decomposition tree for the first three Levels of decomposition to further illustrate the invention. As can be seen, due to the fact that the filters cover different size frequency ranges and the decimation of the midband filter is different than that of the other filters, the outputs from running data through the filters results in different segment lengths at each Level of decomposition.

The number of Levels of decomposition is dependent upon the user selected resolution range necessary for the particular purpose for which the OFDR system is being applied. The present invention may be applied to OFDR systems used to obtain numerous physical characteristics of various hardware systems such as strain, temperature, liquid levels, etc. In fact, the TWT process described herein may be employed to process data from numerous systems within and beyond fiber optics application. Basically, any system that produces time versus frequency data may employ the invention disclosed herein. As used herein, the term user selected resolution range means the level of resolution necessary to obtain data for the physical characteristics of the system being analyzed. Examples of a user selected resolution range include spatial resolution (e.g. 0.5 inches) and minimum and maximum strain gradient thresholds (e.g. 10 microstrain/inch and 40 microstrain/inch).

It should be understood by those skilled in the art that the term decimation as used herein is the process of removing data points, or, in other words, keeping only a subset of the data points. For example, decimating by 2 means keeping only every other data point and decimating by 3 means keeping only every third data point. Also, for the purposes of this application, the term decomposition is defined as dividing down of the signal into smaller segments by running the signal through wavelet filters.

In a preferred embodiment, the lowpass and highpass filters are the Discrete Meyer Wavelet decomposition filters. The invention may operate with other wavelets or filters, but the sharper the filter, the lower the noise, hence the preference for the Discrete Meyer wavelet. Furthermore, in a preferred embodiment, the Discrete Meyer Wavelet decomposition filters are truncated to 16 points from their original length of 102 points. A length of 16 points provides the best compromise between anti-aliasing strength (stopband attenuation) and fast execution (fewer filter points).

In a preferred embodiment, testing has shown that the noise level is reduced by not decimating the outputs of the final stage of filtering, i.e. the output of the final decomposition Level. Furthermore, in a preferred embodiment, when the last stage of filtering consists of the highpass wavelet filter, noise level is reduced further when the decimation step is not performed on signals emerging from either a lowpass filter or a highpass filter in the next to last stage of filtering.

One advantage of this modified WPT approach over the STFT approach is that spatial resolution along the fiber can be set locally rather than globally. When using the STFT, the whole length of the fiber is divided into segments equal in frequency (and therefore equal in length; for example, 40 feet of fiber divided into 0.5 inch analysis segments). When using the TWT, spatial resolution at any particular location along the fiber is determined by how many Levels of decomposition are performed in that area of the fiber. Thus with spatial resolution determined locally, spatial resolution can be variable along the fiber, and this has efficiency benefits. In locations where only coarse spatial resolution is needed (for example 2 inch analysis segments over the first 20 feet of fiber), decomposition only needs to be performed to relatively few Levels, thus saving execution time and providing no more than the number of data points needed. Likewise, in locations where fine spatial resolution is needed (for example, 0.25 inch analysis segments over the last 20 feet of fiber), decomposition can be performed to additional Levels without imposing additional resolution upon other portions of the fiber.

Another advantage of the present invention is that the whole length of fiber does not need to be analyzed. If, for example, only the first 20 feet of fiber has data of interest, then only signal from the first 20 feet of fiber needs to be processed. Thus 20 feet of fiber can be analyzed twice as fast as 40 feet of fiber. In prior art methods, the entire length of fiber (for example, 40 feet) is analyzed no matter how many feet (e.g. only 20) are of interest.

The invention also includes a method to adapt the demultiplexing process to a user selected resolution range in order to further reduce the amount of data that must be processed during the demultiplexing process.

The invention includes two general methods to accomplish said adaptation. The first approach adjusts the depth to which the data is decomposed depending on the user selected resolution range. The advantage of this approach is that it performs only the decompositions that are needed for the Level at which the algorithm is currently operating. However, one disadvantage is that it is possible, in some circumstances, for the approach to miss phenomena that are occurring at a scale significantly finer than the user selected resolution range In general, in the first adaptation method, one may discontinue decomposition through one or more of the filters when the user selected resolution range is met. For the case of obtaining strain using OFDR, the user specifies the minimum and maximum desired spatial resolution as well as a measurement accuracy threshold. The user also specifies minimum and maximum strain gradient thresholds. When the gradient between neighboring strain measurements exceeds the maximum threshold, the decomposition is extended in that location of the fiber in order to provide more spatial resolution in that area. When neighboring strain measurements fall below the minimum threshold, the decomposition for that portion of the fiber is retracted to reduce the spatial resolution in that area.

More specifically, when employing the first adaptation method, given the user-specified inputs discussed above, a coarse decomposition tree is constructed such that no measurements are farther apart than the maximum spatial resolution specified. Also, a fine decomposition tree is constructed such that no measurements are closer together than the minimum spatial resolution specified. Next an index matrix is set up to keep track of where each measurement is currently located in the decomposition tree. This matrix is updated at the end of every scan. Finally, the index matrix is initialized such that all measurements start at fine resolution.

Three tasks are performed for each scan of data: first, the scan is processed using the current decomposition tree; then results are thinned out by omitting unneeded points; finally, the index matrix is updated for the next scan using the results from this previous scan. The task of thinning out unneeded points is based upon the principle that it only takes two points to define a straight line. More than two points might provide additional information, however, omitting points increases processing speed.

So starting with the first and third points, an estimate is made of what the second point would be if it were exactly on a straight line with the first and third points. The estimate is compared with the actual measurement. If the difference between the actual value and estimated value is less than the user specified measurement accuracy, then the point is considered to be superfluous and not transmitted. Subsequent points are evaluated the same way.

For example, using the third and fifth points, an evaluation is made of the fourth point. Then using the fifth and seventh points, an evaluation is made of the sixth point. This continues until all the even numbered points have been evaluated. Then additional passes are made to see if additional points can be omitted. For example, if the second and fourth points were considered superfluous, then using the first and fifth points, an evaluation is made of the third point to see if it can be omitted as well. Evaluations of intermediate points continue in this way until points can no longer be omitted because doing so would result in the remaining points being farther apart than the maximum desired separation.

In addition, the gradients between neighboring results from the scan are evaluated against the user-specified strain gradient thresholds. When the gradient between neighboring strain measurements exceeds the maximum threshold, the decomposition tree is extended in that location of the fiber in order to provide more spatial resolution in that area. When neighboring strain measurements fall below the minimum threshold, the decomposition tree for that portion of the fiber is retracted to reduce the spatial resolution in that area (this may be implemented by updating the index matrix to point to the appropriate places in the decomposition tree).

In employing the second adaptation method, the user decomposes the FOSS signal to the finest resolution. The advantage of this approach is that it never misses any small scale phenomena. However, the disadvantage is that this approach performs more decompositions than are typically needed, and therefore it is typically slower than the previously discussed approach.

Note that both approaches thin out results that are linearly related. This optimizes transmission bandwidth by omitting unneeded points.

The fundamental difference between the first adaptation method and the second adaptation method is that when employing the second adaptation method the decomposition tree never changes. It starts out as the fine tree and stays that way the whole time. Adaptive spatial resolution is still achieved, but instead of being accomplished directly by adapting the decomposition tree, it is accomplished indirectly by manipulating the output (thinning out unneeded points).

Hence, the second adaptation method is merely an abridged version of the first adaptation method. Specifically, the step of adjusting the decomposition tree is simply omitted.

Additionally, in an embodiment of the invention, results from one scan are used to focus processing during the subsequent scan on relevant portions of the time domain signal. This focusing is applied at each Level of decomposition. For example, if at a given level of decomposition, the set of FBGs still present in the signal have responded to laser wavelengths of 1551 to 1553 nm, then, rather than process the data points for the whole scanning range (for example, 1549 to 1557 nm), only the data points in the range of 1551 to 1553 nm plus or minus a user-determined focus margin need to be processed. A smaller focus margin results in faster processing; however, a larger focus margin reduces the likelihood that a change in result would be missed in the subsequent scan.

Testing with this focusing method has shown a three-fold increase in processing speed. Using a setup of a 40 foot fiber, 8 nm wavelength range, 262144 samples/scan, 1 inch maximum desired separation, and 1022 measurement locations the following processing rates were obtained:

Without focusing: 4.3 scans/sec

With a 12% focus margin: 10 scans/sec (2.3 times as fast as without focusing)

With a 6% focus margin: 13 scans/sec (3 times as fast as without focusing)

With a 2% focus margin: 16-17 scans/sec (~4 times as fast as without focusing; however, it should be understood that this small of a margin would not be viable with the setup described for this test).

The method also incorporates steps to address any potential errors in identifying the strain points along the fiber in any particular scan.

Suppose, for example, that an error occurs and a single strain point is computed to be 50% full scale when it really is at 20%. If the focus margin is 10%, then the data processed for the next scan will be between 40 to 60% of the full strain range. The method herein addresses this potential issue by providing a user defined strain threshold which compares the current scan to the previous scan. If the difference between the current result and previous result is larger than the user defined threshold, then the current result is considered suspect and not used to center focusing for the next scan. Instead the previous, good value is carried forward and used.

Just as focusing data using previous scans can increase the speed in processing subsequent scans, one may also focus data processing by using interim strain results within a single scan. This is accomplished by comparing a specific measurement location's strain result with that of its neighboring measurement location within the same scan. This part of the invention can be employed if the spacing between measurement locations is sufficiently small compared to the strain gradient along the fiber. In such a case, the neighbor's strain result is helpful for focusing like the location's previous result is useful if the time interval between samples is short enough as described above. To implement this part of the method, similar steps to those described for focusing data between scans would be employed.

What is described herein are specific examples of many possible variations on the same invention and are not intended in a limiting sense. The claimed invention can be practiced using other variations not specifically described above.

What is claimed is:

1. A method for obtaining physical properties from a system, having sensors deployed thereon, using a plurality of sensor readings and demultiplexing raw, multiplexed time versus frequency data, comprising the steps of:
    reading the sensors to obtain a first set of raw, multiplexed time versus frequency data;
    demultiplexing the first set of raw, multiplexed time versus frequency data by running the first set of raw, multiplexed time versus frequency data through a lowpass wavelet filter, a midband wavelet filter, and a highpass wavelet filter to obtain demultiplexed lowpass results, midband results, and highpass results, wherein the midband filter comprises a frequency range having a center of about 0.250 fs;
    decimating the lowpass and highpass results by 2 and the midband results by 3; and,
    continually demultiplexing and decimating the demultiplexed lowpass, midband, and highpass results a number of times determined by a user selected resolution range so that the final demultiplexed results may be used to obtain physical properties associated with the system from which the raw, multiplexed time versus frequency data is obtained.

2. The method of claim 1, wherein the decimation step is not performed on a final Level of demultiplexed results.

3. The method of claim 2, wherein the decimation step is not performed on a final two Levels of demultiplexed results.

4. The method of claim 1, wherein the lowpass and highpass filters comprise Discrete Meyer Wavelet decomposition filters.

5. The method of claim 4, wherein the Discrete Meyer Wavelet decomposition filters comprise a length truncated to 16 points.

6. The method of claim 1, wherein the lowpass wavelet filter comprises a frequency range of 0 to about 0.2 fs, the midband wavelet filter comprises a frequency range of about 0.2 to about 0.3 fs, and the highpass wavelet filter comprises a frequency range of about 0.3 to 0.5 fs.

7. The method of claim 1, further comprising the steps of:
    analyzing the demultiplexed lowpass results, midband results, and highpass results at each demultiplexed level against a user selected resolution range; and,
    discontinuing demultiplexing through one or more of the lowpass wavelet filter, midband wavelet filter, and highband wavelet filter when the user selected resolution range is met; or increasing demultiplexing through one or more of the lowpass wavelet filter, midband wavelet filter, and highpass wavelet filter when the user selected resolution range is not reached.

8. The method of claim 1, further comprising the steps of:
    analyzing the final demultiplexed results versus a user selected resolution range; and,
    discarding demultiplexed lowpass results, midband results, and highpass results that exceed or fall below the user selected resolution range to obtain updated final demultiplexed results.

9. A method of obtaining physical properties of an optical fiber using an Optical Frequency Domain Reflectometry system having an optical fiber with Fiber Bragg Grating sensors therein and a light source, using a plurality of scans, comprising the steps of:
    scanning the fiber with the light source to obtain raw data;
    decomposing the raw data by running the raw data through a lowpass wavelet filter, a midband wavelet filter, and a highpass wavelet filter to obtain decomposed lowpass results, midband results, and highpass results;

continually decomposing the decomposed lowpass, midband, and highpass results a number of times determined by a user selected resolution range to obtain final decomposed results;

using the final decomposed results to obtain physical property information at locations along the optical fiber;

specifying a user selected focus margin;

analyzing the physical property information from the initial scan to determine physical property values along the optical fiber that exceed a selected physical property threshold;

initiating a next scan with the light source of the optical fiber to obtain raw data; and, repeating the decomposing and continually decomposing steps only on portions of the conglomerate data selected by adding the user selected focus margin to each side of the physical property values at each measurement location, then repeating the using the final decomposed results, using the Fiber Bragg Grating sensor, analyzing, and initiating a next scan steps a user selected number of times to obtain final physical property information.

10. The method of claim 9, further comprising the steps of:

decimating the lowpass and highpass results by 2 and the midband results by 3 after each decomposition step.

11. The method of claim 10, wherein the decimation step is not performed on a final Level of decomposition results.

12. The method of claim 11, wherein the decimation step is not performed on a final two Levels of decomposition results.

13. The method of claim 9, wherein the lowpass and highpass filters comprise Discrete Meyer Wavelet decomposition filters.

14. The method of claim 13, wherein the Discrete Meyer Wavelet decomposition filters comprise a length truncated to 16 points.

15. The method of claim 14, wherein the midband filter comprises the lowpass filter upsampled twice cascaded with the highpass filter upsampled once.

16. The method of claim 9, wherein the lowpass wavelet filter comprises a frequency range of 0 to about 0.2 fs, the midband wavelet filter comprises a frequency range of about 0.2 to about 0.3 fs, and the highpass wavelet filter comprises a frequency range of about 0.3 to 0.5 fs.

17. A method for obtaining physical properties from a system, having sensors deployed thereon, using a plurality of sensor readings and demultiplexing raw time versus frequency data, comprising the steps of:

reading the sensors to obtain a first set of conglomerate raw time versus frequency data;

decomposing the data by running the first set of conglomerate raw time versus frequency data through a lowpass wavelet filter, a midband wavelet filter, and a highpass wavelet filter to obtain decomposed lowpass results, midband results, and highpass results for physical property information;

specifying a user selected focus margin;

analyzing the physical property information from the first sensor reading to determine physical property values that exceed a selected physical property threshold;

initiating a next set of sensor readings a second set of conglomerate raw time versus frequency data; and, repeating the decomposing and continually decomposing steps only on portions of the conglomerate data selected by adding the user selected focus margin to each side of the physical property values at each measurement location, then repeating the continually decomposing, analyzing, and initiating steps a user selected number of times to obtain physical property information.

18. The method of claim 1, wherein the midband filter comprises the lowpass filter upsampled twice cascaded with the highpass filter upsampled once.

* * * * *